United States Patent [19]

Ohno et al.

[11] 4,190,349
[45] Feb. 26, 1980

[54] SLIDER RECIPROCATING DRIVING APPARATUS FOR USE WITH ELECTROPHOTOGRAPHIC COPYING MACHINE

[75] Inventors: Yukihiro Ohno, Maebashi; Nobuyuki Yanagawa, Chigasaki, both of Japan

[73] Assignee: Ricoh Company, Ltd., Japan

[21] Appl. No.: 911,412

[22] Filed: Jun. 1, 1978

[30] Foreign Application Priority Data

Jun. 2, 1977 [JP] Japan .................................. 52-65122
Jun. 7, 1977 [JP] Japan .................................. 52-66931

[51] Int. Cl.² .......................................... G03G 15/28
[52] U.S. Cl. ..................................... 355/8; 355/14 R
[58] Field of Search ................. 355/8, 14, 3 R; 74/27, 74/25

[56] References Cited

U.S. PATENT DOCUMENTS

| | | | |
|---|---|---|---|
| 3,790,272 | 2/1974 | Knechtel et al. ...................... | 355/8 X |
| 3,918,806 | 11/1975 | Cook ........................................ | 355/8 |
| 3,989,369 | 11/1976 | Namba ..................................... | 355/8 |
| 3,990,792 | 11/1976 | Kono et al. ............................. | 355/8 |
| 4,139,300 | 2/1979 | Katayama et al. .................. | 355/8 X |

*Primary Examiner*—R. L. Moses
*Attorney, Agent, or Firm*—McGlew and Tuttle

[57] ABSTRACT

The apparatus comprises a driving mechanism for reciprocating a slider having a contact glass thereon, and a rotation control member which is associated with the driving mechanism and which makes one rotation per two rotations of a photoconductor drum and one reciprocating cycle of the slider. Through the rotation control member, a copying process can be controlled in association with the rotations of the photoconductor drum. The slider can be reciprocated freely when the copying machine is not in operation by the present known slider reciprocating driving apparatus. A stopper for stopping the forward movement of the slider without causing any adverse shock is provided.

9 Claims, 22 Drawing Figures

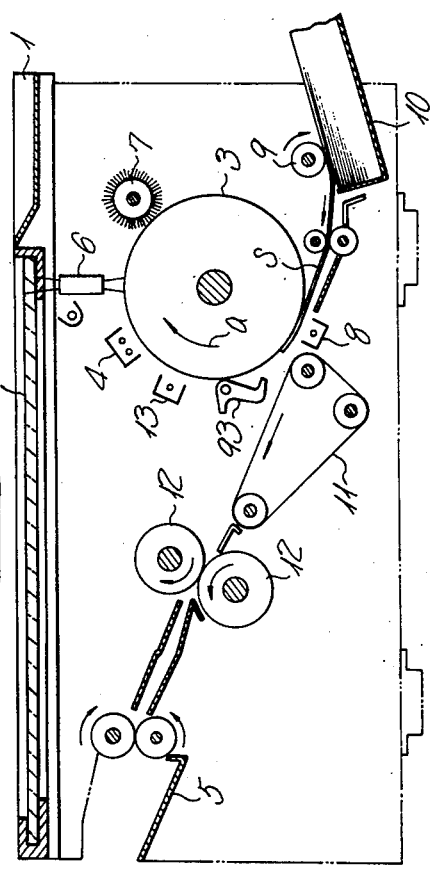
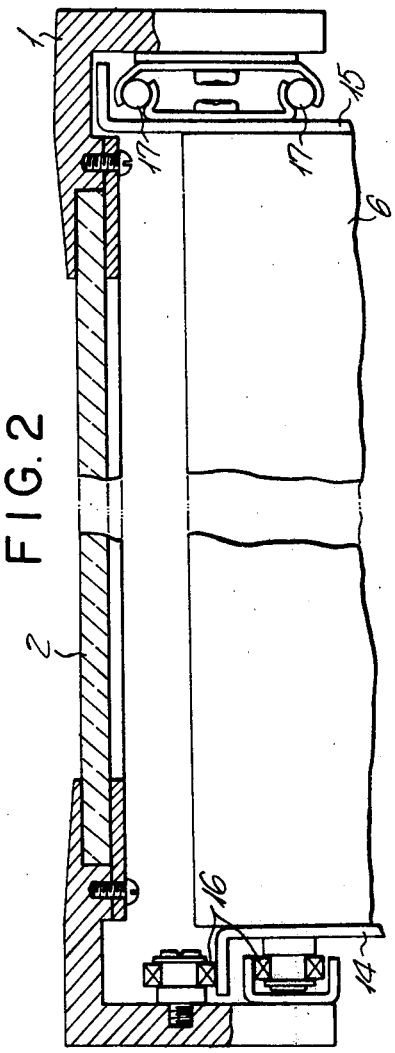

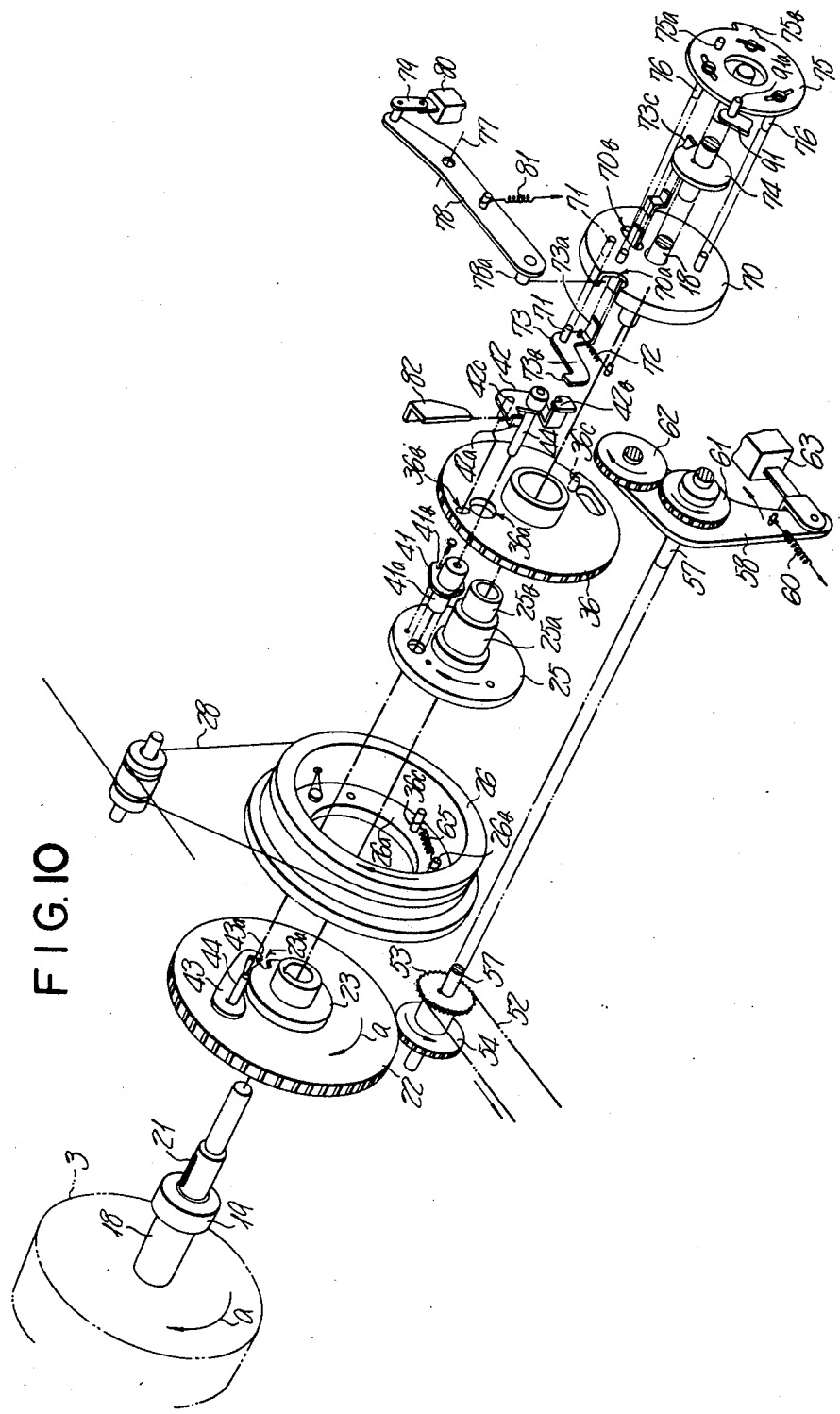

SLIDER RECIPROCATING DRIVING APPARATUS FOR USE WITH ELECTROPHOTOGRAPHIC COPYING MACHINE

BACKGROUND OF THE INVENTION

This invention relates to a slider reciprocating driving apparatus for reciprocating a slider having a contact glass thereon for use in an electrophotographic copying machine, and more particularly to a slider reciprocating driving apparatus including a rotation control member which is rotated intermittently in association with the driving mechanism for reciprocating the slider, and in which the intermittent rotation of the rotation control member controls a sequence of a copying process of the copying machine and in which the slider can be reciprocated freely when the copying machine is not in operation.

In an electrophotographic copying machine of the type whose contact glass is movable, a slider supporting the contact glass thereon is reciprocated by a predetermined stroke in accordance with the rotation of a photoconductor drum for forming a latent electrostatic image corresponding to an image of an original document to be copied on the photoconductor drum during the forward movement of the slider.

In the field of this technique, various driving mechanism for reciprocating the slider have been proposed. In one example of the reciprocating mechanism, a pulley around which a wire for directly driving the slider is wound, and a magnetic clutch disposed in a driving mechanism for driving the pulley are employed so as to reciprocate the pulley, by energizing and deenergizing the magnetic clutch. Such a slider driving method, however, has some shortcomings. For example, the magnetic clutch itself is expensive and its torque is varied by variation of an input voltage to the magnetic clutch, and some slipping occurs in the magnetic clutch due to foreign material entering a brake portion of the magnetic clutch.

In contrast with this, a slider driving apparatus which is operated by mechanical means only, without employing the above-mentioned magnetic clutch, has been proposed by the inventors of the present invention (refer to Japanese Patent Application No. 33766/1976). In this driving apparatus, a wire is wound around the peripheral surface of a wire drum and one end of the wire is connected to the leading end of a slider and the other end of the wire is connected to the rear end of the slider so that the wire drum is rotated in the forward and the backward direction, and the switching between the forward and backward rotations is effected by a mechanical clutch.

As is well known, the copying process of an electrophotographic copying machine comprises various steps such as charging, exposure, development and paper feed. These steps are followed in accurately timed relation. For example, a paper feed apparatus has to be operated properly in order to feed a transfer sheet to a transfer station. A control of such a step could be made easily by use of a timer. However, an appropriate electric control circuit is required.

From this point, it would be useful to provide a process control mechanism for effecting the above-mentioned sequence control, and to incorporate the process control mechanism in the above-mentioned purely mechanical slider driving apparatus in such a manner as to operate the process control mechanism associated with the driving mechanism, since such an electrical control circuit and a timer, as mentioned above, are unnecessary and the driving system can be simplified.

In the above-mentioned slider driving apparatus, when the copying machine is not in operation, the slider cannot be reciprocated freely. Therefore, it is difficult to adjust the timing of each element of the copying machine at the time of assembling, inspection and maintenance of the copying machine. Furthermore, when a paper jam occurs during the operation of the copying machine, it is difficult to remove jammed paper.

SUMMARY OF THE INVENTION

It is therefore a principal object of the present invention to provide a slider reciprocating driving apparatus capable of reciprocating the slider freely when an electrophotographic copying machine is not in operation.

Another object of the invention is to provide a slider reciprocating driving apparatus capable of controlling a series of copying processes of the copying machine by a rotation control means which gives one rotation to necessary elements with respect to two rotations of a photoconductor drum.

A further object of the invention is to provide a shock absorbing apparatus for use with the slider reciprocating driving apparatus, which also makes it possible to change the movement direction of the slider securely.

In order to attain the above-mentioned objects, in the present invention, a rotation control means is provided, which is rotated intermittently in one direction in association with the slider reciprocating driving apparatus, whereby a series of copying processes are controlled.

Furthermore, when the copying machine is not in operation, a stopper means is disengaged from the rotation control means and a rotating means which makes a forward movement of the slider so that the slider, can be reciprocated freely.

Moreover, in the shock absorbing apparatus, a slider stopper is disposed at a position where the forward movement of the slider is completed, an abutment member of the slider stopper is attached to a side plate of the copying machine through fixing members and shock absorbing spring means, and a stopper portion, which extends from the abutment member serves as a member, for switching the forward movement of the slider to the backward movement.

BRIEF DESCRIPTION OF THE DRAWINGS

FIG. 1 is a schematic sectional side elevation of an electrophotographic copying machine in which the present invention can be suitably employed.

FIG. 2 is a schematic sectional view of a slider of the present invention, which is for use with the electrophotographic copying machine of FIG. 1.

FIG. 10 is an exploded perspective fragmentary view of the slider driving apparatus of FIG. 9.

DETAILED DESCRIPTION OF THE PREFERRED EMBODIMENT

Figure 3:
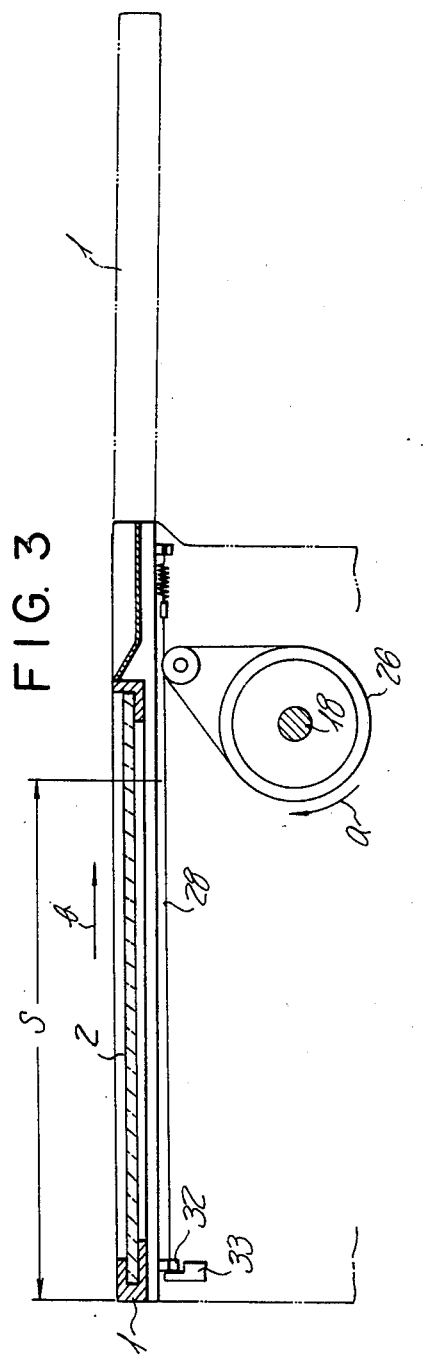
FIG. 3 is a schematic sectional side elevation of an upper portion of the electrophotographic copying machine for explaining the reciprocating movement of the slider according to the invention.

Referring to FIG. 1, there is shown an electrophotographic copying machine in which the present invention is to be employed. In this electrophotographic copying machine, a copy is made as follows. An original document is placed on a contact glass 2 of a slider 1. On pressing a print button (not shown), a photoconductor drum 3 begins to be rotated in the direction of the arrow a and, in accordance with the rotation of the photoconductor drum 3, the slider 1 is moved in the direction of the arrow b (hereinafter called the forward movement). Furthermore, in accordance with the rotation of drum 3 and the forward movement of the slider 1, a latent electrostatic image is formed, by an image transmitting optical fiber element 6, on the photoconductor drum 3 whose surface has been charged uniformly by a corona charger 4. The latent electrostatic image is developed by a development brush 7.

In the meantime, a paper feed roller 9 begins to rotate. By the rotation of the paper feed roller 9, a top transfer sheet S of transfer sheets stacked on a paper feed table 10 is transported in the direction of the arrow and the leading edge of the transfer sheet S is caused to coincide with the leading edge of a developed visible image on the photoconductor drum 3 near an image transfer charger 8. By the image transfer charger 8, the visible image is transferred from the photoconductor drum 3 to the transfer sheet S. The transfer sheet S is then transported between a pair of fixing rollers 12 by a sheet transport belt 11 and the visible image is fixed to the transfer sheet S during the passage of the transfer sheet S between the fixing rollers 12. The transfer sheet S is then discharged onto a sheet output tray 5. In the meantime, a residual change on the photoconductor drum 3 is removed by a quenching charger 13. The photoconductor drum 3 is rotated further and, when it has made two revolutions exactly from a position where the charging of the photoconductor drum 3 is started, one copy is obtained.

A driving mechanism and an operation process of the slider 1 of this copying machine will now be described. Referring to FIG. 3, the slider 1 is moved forward in the direction of the arrow b by a stroke St for an exposure scanning. After the exposure scanning, the slider 1 is moved backward in the direction opposite to the arrow b. The slider 1 is slidably supported by fixed side plates 14, 15, bearings 16, and balls 17, as shown in FIG. 2. The slider 1 is moved forwards and backwards by the clockwise and counterclockwise rotations of a wire drum 26 around which a wire 28 is wound. To be more specific, when the wire drum 26 is rotated clockwise in the direction of the arrow a, the slider 1 is pulled by the wire 28 so as to be moved forward in the direction of the arrow b. After this, the wire drum 26 is stopped and is then rotated reversely, whereby the slider 1 is moved backwards.

Figure 9:
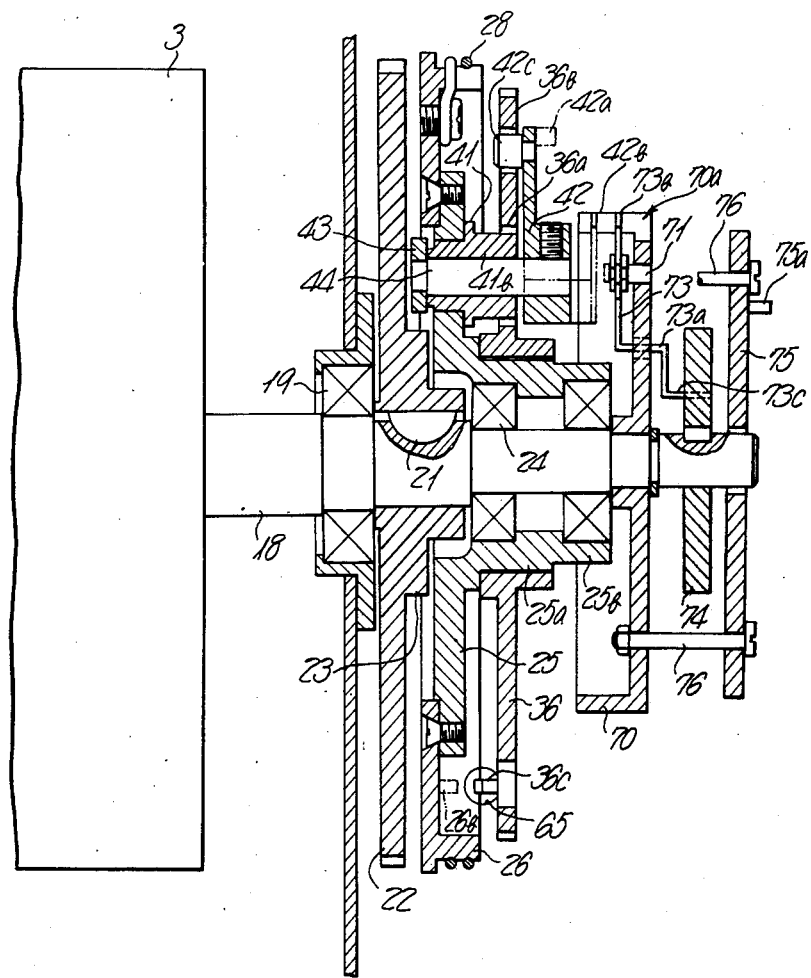
FIG. 9 is a schematic sectional view of a slider driving apparatus in which the present invention is employed.

A driving mechanism of the clockwise and counterclockwise rotations of the wire drum 26 will be described now. Referring to FIGS. 9 and 10, the wire drum 26 is secured to a drum shaft 18 and a rotation operation member 25 is rotatably mounted on shaft 18 through bearings 24. The photoconductor drum 3 is fixedly mounted on the shaft 18. A large diameter hub portion 25a of the rotation operation member 25 is fitted in a backward movement gear 36. A forward movement gear 22 is keyed to the shaft 18 by a key 21. A forward movement driving gear 54 is engaged with the forward movement gear 22 so that the forward movement gear 22 is rotated in the direction of the arrow a. A rotating member 23, which is integral with the forward movement gear 22, is continuously rotated clockwise (i.e., in the direction of the arrow a), together with the photoconductor drum 3, during the copying step.

To the rotation operation member 25 is eccentrically fixed a bush 41, and a boss hub portion 41b of the bush 41 is inserted into a hole 36a of the backward movement gear 36. The inner diameter of the hole 36a is larger than the outer diameter of the boss hub portion 41b. On one end of a shaft 44 which is fittingly inserted into the bush 41, there is fixedly mounted a stopping member 42 and, on the other end of the shaft 44, there is fixedly mounted a ratchet pawl 43. A pin 42c, fixed to one end of an arm of the stopping member 42, is inserted into a slot 36b of backward movement gear 36.

Figure 12:
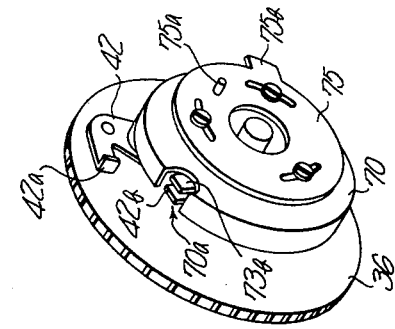
FIG. 12 is a perspective view of a rotation control member and members arranged around the rotation control member.

Still referring to FIGS. 9 and 10, a cylindrical rotation control member 70 is fittingly mounted on the shaft 18 with a bit such that the rotation control member 70 can be rotated manually by force relative to the shaft 18. A shaft 71 is fixed eccentrically to a diometric wall of the rotation control member 70. On the shaft 71 is pivotally mounted a feed lever 73 which is biased to rotate about the shaft 71, in the direction of the arrow, by a spring 72. A bend 73a, formed in one arm of the feed lever 73, passes through a hole 70b of the rotation control member 70, and a bend 73c formed at the end of the bend 73a extends up to an auxiliary feed cam 74 keyed on the shaft 18. In a stopping notch 70a formed at a portion of the peripheral surface of the rotation control member 70, a projection 73b of the feed lever 73 and a stopping projection 42b are disposed side by side as shown in FIG. 12.

Figure 13:
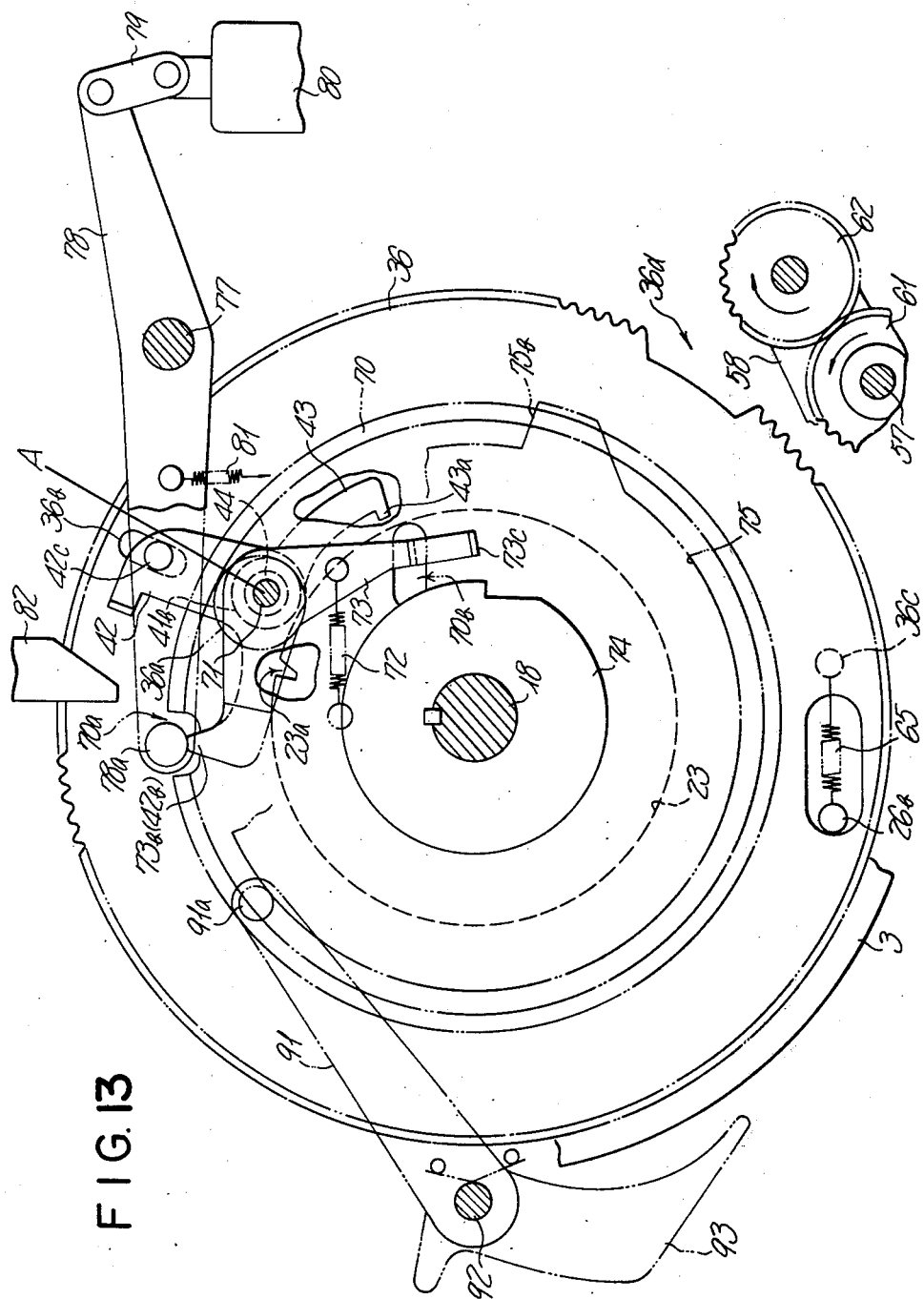
FIG. 13 is a schematic partly sectional side view of a main portion of a slider reciprocating driving apparatus of the present invention, in which each member is located in its home position.

Reference numeral 75 represents a control disk for performing a sequential control of a copying process as will be described later in detail. This control disk 75 is fixed to the rotation control member 70 by fitting bolts 76. Above the rotation control member 70 is situated an operation lever 78 which is pivotally mounted on a fixed shaft 77 as shown in FIG. 13. One end of the operation lever 78 is connected to a starting solenoid 80 through a connecting link 79. On the other end of the operation lever 78 is fixed a pin 78a which can selectively enter the stopping notch 70a. The pin 78a is normally located in the stopping notch 70a as shown in FIG. 13.

A driving mechanism of the slider 1 and a rotation control apparatus of the present invention will now be described by referring to FIG. 13. All the movable elements are in their respective positions shown in FIG. 13. In this condition, when a print button (not shown) is pressed, a main driving motor (not shown) begins to rotate, whereby a sprocket 53 is rotated by a driving chain 52 which constitutes one element of a forward driving mechanism shown in FIG. 10, so that the forward movement driving gear 54 and a shaft 57, which are fixed to rotate with the sprocket 53, are rotated in the direction of the arrow in FIG. 10. By this rotation, the forward movement gear 22, the rotating member 23, the shaft 18 and the photoconductor drum 3 are integrally rotated in the direction of the arrow a.

Meanwhile, by the rotation of the shaft 57, a backward movement driving gear 61 and a pinion 62 are rotated in the directions of their respective arrows. However, at this moment, pinion 62 is retracted from the backward movement gear 36.

Figure 14:
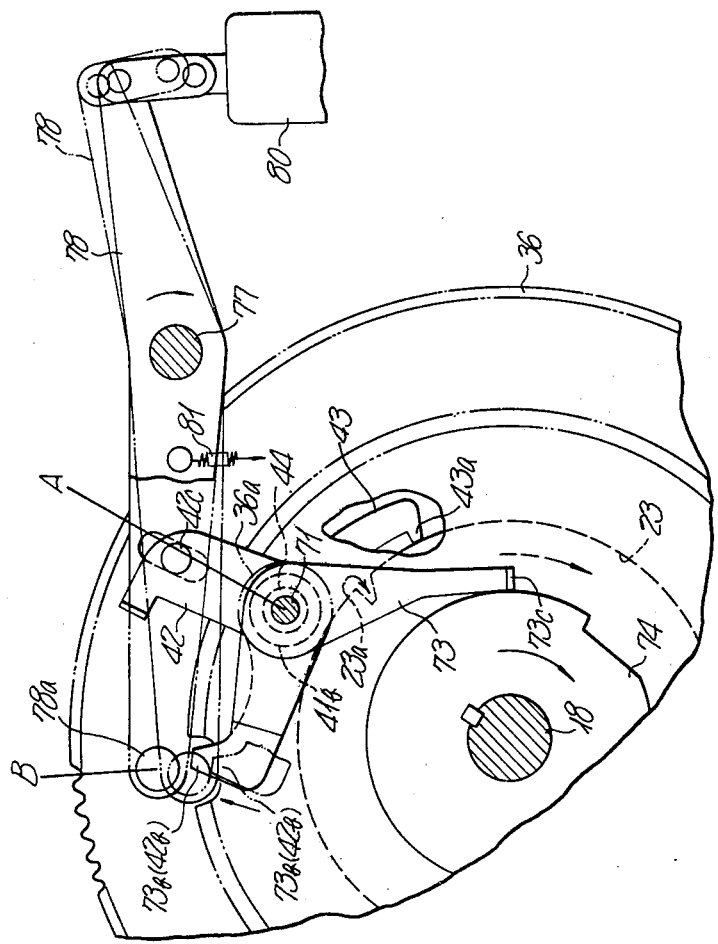
FIG. 14 is a partial schematic sectional side view of the main portion of the slider reciprocating driving apparatus of FIG. 13, in which a starting solenoid is energized.

As mentioned previously, by the rotation of the photoconductor drum 3 in the direction of the arrow a, the charging step, exposure step and other steps necessary for copying are carried out. Supposing that the rotation of the photoconductor drum 3 in the direction of the arrow a is defined as a forward rotation, the rotating member 23, and the auxiliary feed cam 74, which is keyed to the shaft 18, are rotated in the forward direction. In other words, referring to FIG. 13, by the pressing of the print button, only the shaft 18, the auxiliary feed cam 74 and the rotating member 23 begin to rotate clockwise from their respective positions. FIG. 14 shows the movement of each member during this rotation.

Figure 15:
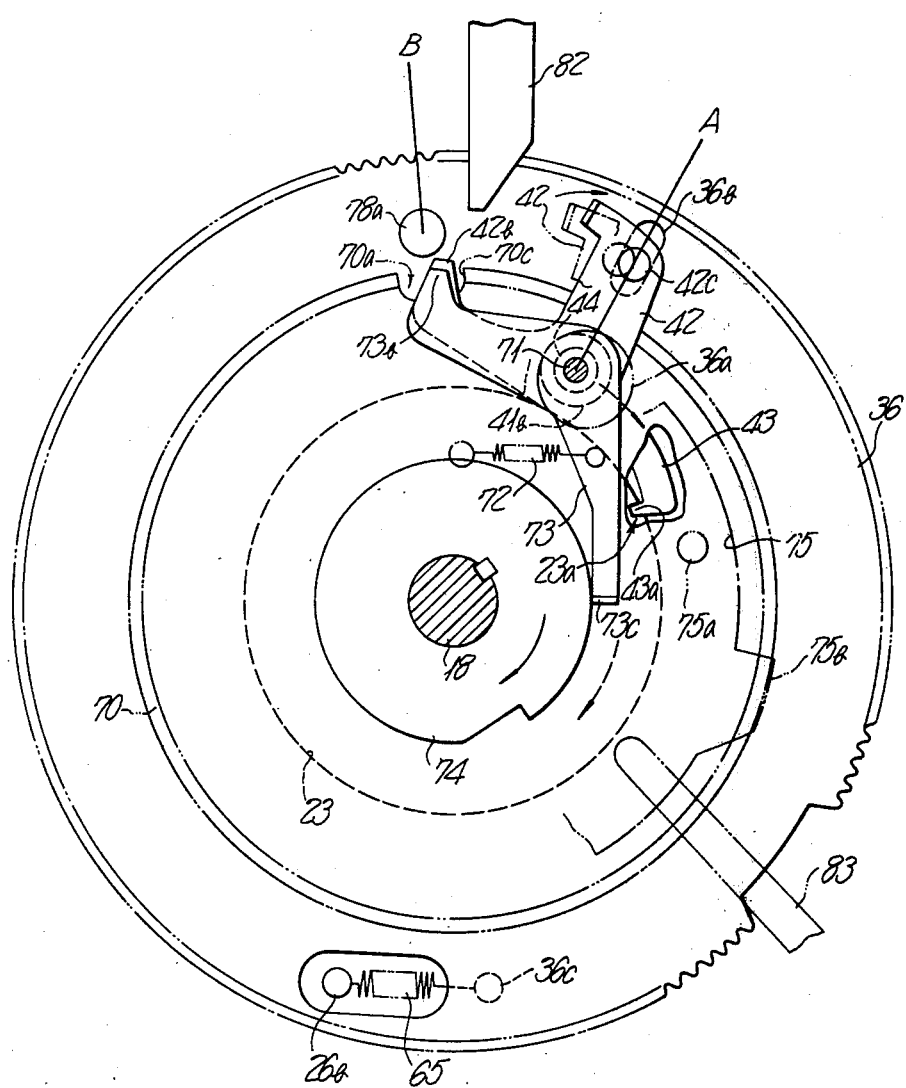
FIG. 15 is a partly schematic sectional side view of the main portion of the slider reciprocating driving apparatus of FIG. 13, in which a ratchet pawl is engaged with a rotating member so that all the movable elements are above to be rotated clockwise.

Referring now back to FIG. 13, the starting solenoid 80 is designed so as to be energized upon pressing the print button and, in accordance with the energizing of the starting solenoid 80, the operation lever 78 is rotated clockwise about the fixed shaft 77 against the bias of a spring 81, whereby the pin 78a of the operation lever 78, which has been in the stopping notch 70a of the rotation control member 70 and which has been pushing the projection 73b and the stopping projection 42b (refer to FIG. 12), is retracted from the stopping notch 70a as shown in FIG. 14. As a result, the feed lever 73 is rotated clockwise about the shaft 77 under the bias of the spring 72 (refer to FIG. 10), and a projection 73c of the lever feed lever 73 is brought into pressure contact with the peripheral surface of the auxiliary feed cam 74 which has already begun to be rotated from its home position, as shown in FIG. 14. Furthermore, the stopping member 42 is rotated in the same direction, as it is biased to rotate clockwise about the shaft 44 (refer to FIG. 10) by an action as will be described later. The axis of member 42 coincides with that of the feed lever 73, whereby a stopping pawl 43a, formed at the tip of the ratchet pawl 43 (refer to FIG. 10) which is substantially integral with the stopping member 42, is brought into pressure contact with the peripheral surface of the rotating member 23 which has already begun to be rotated as shown in FIG. 14. When a notch 23a, formed at the peripheral surface of the rotating member 23, comes to the stopping pawl 43a with a further rotation of the rotating member 23, the stopping pawl 43a is engaged with the notch 23a as shown in FIG. 15. Namely, the stopping member 42 is rotated clockwise a little further from its position shown in FIG. 14. On the other hand, the feed lever 73 keeps its position shown in FIG. 14.

Consequently, the stopping member 42 is rotated clockwise from the position shown in FIG. 13 to the position shown in FIG. 15. The clockwise rotation of the stopping member 42 is made as follows. Referring to FIG. 10, a spring 65 (refer to FIG. 9) is spanned between a pin 26b, fixed to a side wall 26a of the wire drum 26, and a pin 36c, fixed to a side wall of the backward movement gear 36, which faces the wire drum 26, so that, by the resilience tension of the spring 65, the backward movement gear 36 is given a clockwise bias about the shaft 18 in FIG. 15 and the wire drum 26 is given a counterclockwise bias, viewed from the right hand in FIG. 9. The rotation of the backward movement gear 36 and that of the wire drum 26 are hindered as follows. Referring to FIG. 15, under the bias of the spring 65, the left inner edge of the hole 36a (refer to FIG. 10) formed in the backward movement gear 36 pushes the hub portion 41b of the bush 41 which is kept stationary at this moment so that the above-mentioned rotations are hindered. In this state, when a stopping projection 42a of the stopping member 42 is pushed by force so that the stopping member 42 is rotated about the shaft 44 from the position shown in FIG. 15 to the position shown in FIG. 3, the pin 42c of the stopping member 42 pushes the left side edge of the slot 36b of the backward movement gear 36 so that the backward movement gear 36 is rotated counterclockwise through a predetermined angle about the shaft 18, to be more specific, about a large diameter boss portion 25a of the rotation operation member 25. In accordance with this rotation, the spring 65 is stretched and the right side inner edge of the hole 36a of the backward movement gear 36 is brought into pressure contact with the hub portion 41b. This signifies that the operation of rotating counterclockwise the stopping member 42 by pushing the stopping projection 42b in FIG. 15 is performed against the resilience of the spring 65 and that the stopping member 42 is always given a clockwise rotating bias in FIG. 13 by the tension of the spring 65. This rotation under the bias of the spring 65 is hindered by the pin 78a of the operation lever 78.

When the stopping member 42 to which a clockwise rotating bias is given is rotated from the position shown in FIG. 13 to the position shown in FIG. 15 by the upward retraction of the pin 78a, and the notch 23a of the cam member 23 comes to the stopping pawl 43a of the ratchet pawl 43 by the rotation of the cam member 23, the stopping pawl 43a is engaged with the notch 23a of the cam member 23 and, at the same time, the bush 41, the stopping member 42 and the ratchet pawl 43 shown in FIG. 10 are moved clockwise together around the shaft 18 in FIG. 15 by the rotating driving force of the cam member 23. In accordance with the movement of the bush 41 around the shaft 18, the rotation operation member 25 is rotated in the direction of the arrow 25 (FIG. 10) and, at the same time, the wire drum 26, which rotates with the rotation operation member 25 is also rotated in the same direction so that the slider 1 is moved forward in the direction of the arrow b as shown in FIG. 3. Furthermore, in accordance with the rotation of the wire drum 26, the backward movement gear 36 is pulled by the spring 65 and begins to be rotated from the position shown in FIG. 15 in the same rotating direction as that of the wire drum 26.

Figure 17:
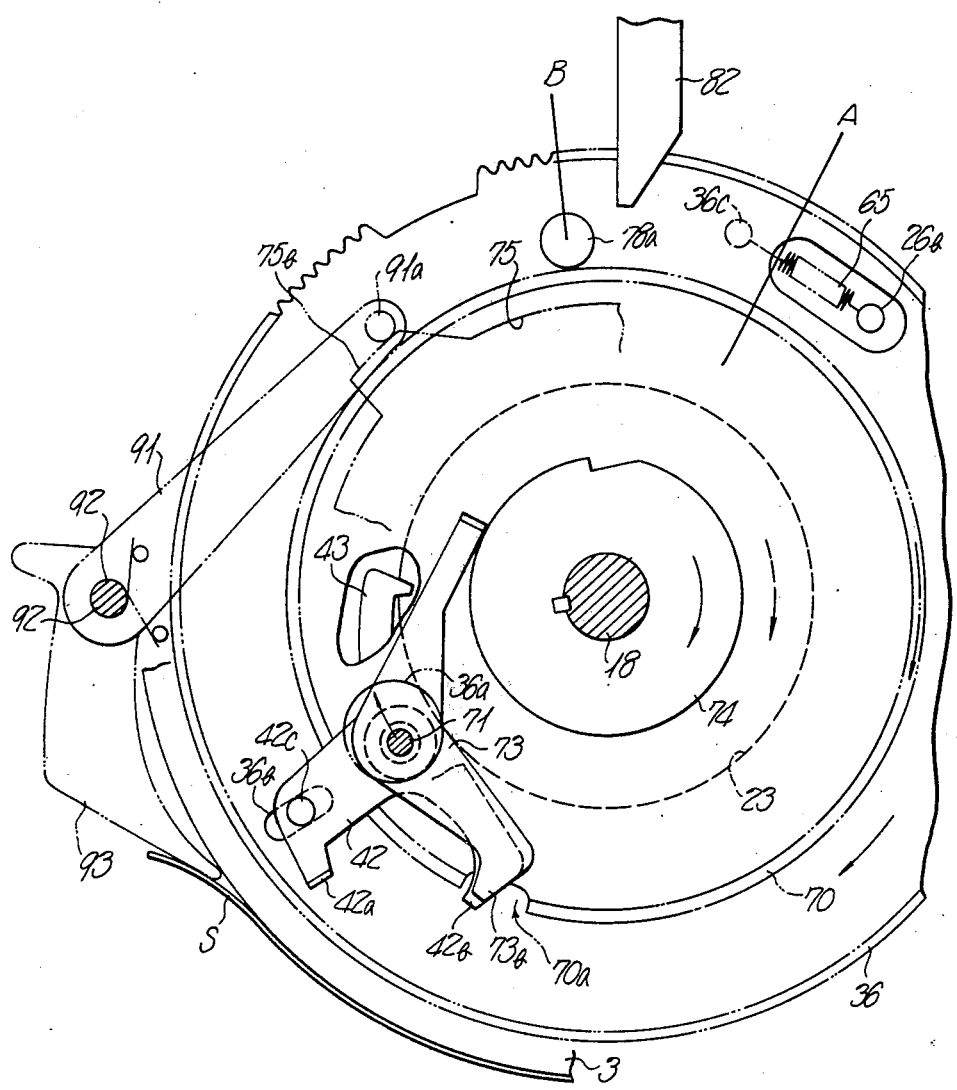
FIG. 17 is a partly schematic sectional side view of the main portion of the slider reciprocating driving apparatus of FIG. 13, in which all the movable elements are in clockwise rotation.

Referring to FIG. 15, when the stopping member 42 begins to revolve around the shaft 18 from the position shown in the figure as mentioned above, the right edge of the stopping projection 42b of the stopping member 42 runs against the cylindrical 70c of the stopping notch 70a of the rotation control member 70 which is mounted on the shaft 18 and is made stationary, so that the rotation control member 70, caught by the stopping projection 42b, is rotated clockwise. Together with the rotation of the rotation control member 70, the feed lever 73 attached to the rotation control member 70 is moved around the shaft 18. Furthermore, the control disk 75 which is substantially integral with the rotation control member 70 is also rotated in the same direction. Namely, at this stage, all the movable elements shown in FIG. 9 are rotated in the forward direction, that is, clockwise, integrally with the shaft 18. FIG. 17 shows the movable elements during the clockwise rotation at this stage.

Referring to FIG. 15, when the rotation control member 70 begins to rotate and the stopping notch 70a passes a position corresponding to the pin 78a of the operation lever 78, the starting solenoid 80 which has been kept energized until then is deenergized in FIG. 14, and the operation lever 78 is rotated counterclockwise about the fixed shaft 77 under the bias of the spring 81 so that the pin 78a is brought into pressure contact with the peripheral surface of the rotation control member 70.

Figure 18:
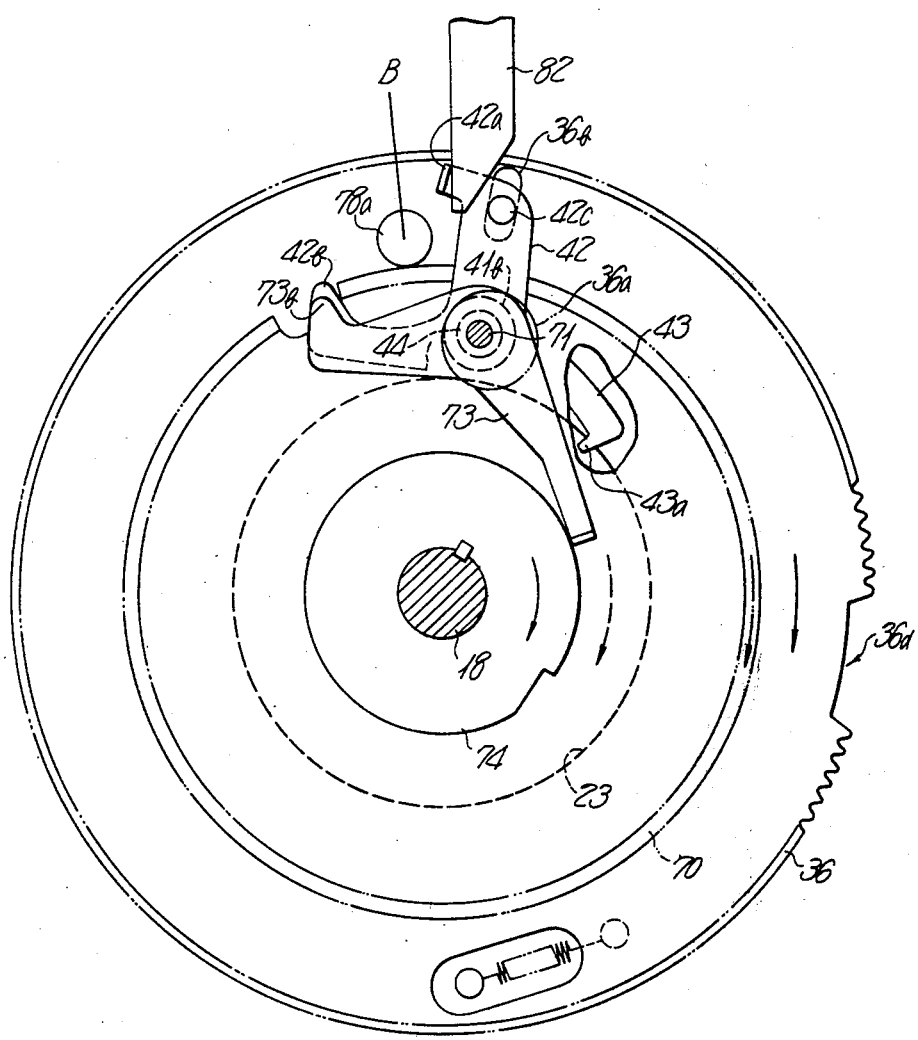
FIG. 18 is a schematic partly sectional side view of the main portion of the slider reciprocating driving apparatus of FIG. 13, in which the ratchet pawl is above to be disengaged from the rotating member.
Figure 19:
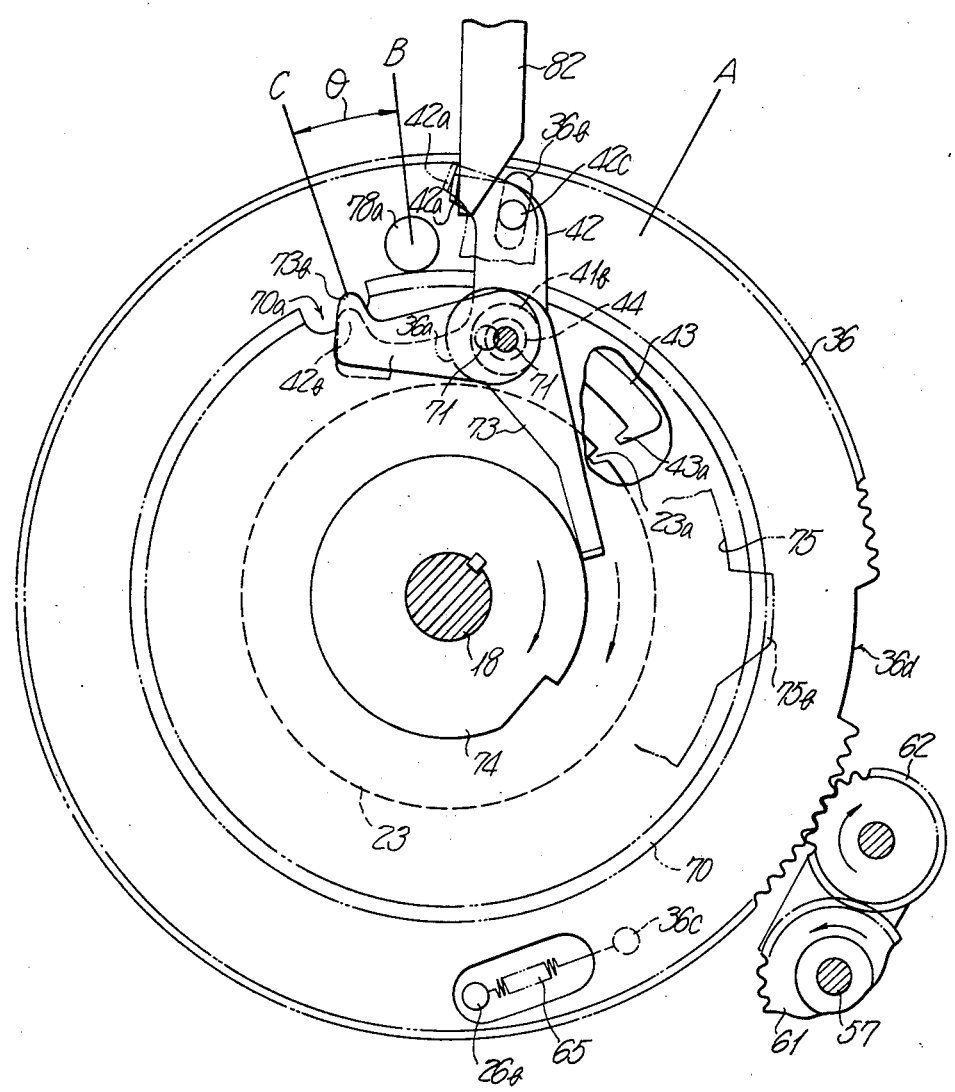
FIG. 19 is a partly schematic sectional side view of the main portion of the slider reciprocating driving apparatus of FIG. 13, in which the ratchet pawl is disengaged from the rotating member.

Referring to FIG. 17, when all the movable elements are rotated integrally and continue such rotation, the bend 42a of the stopping member 42 comes into contact with a side edge of a stopper 82 (refer to FIG. 10) as shown in FIG. 18 and reaches a position shown in FIG. 19 with a little further rotation. When the central position of the shaft 71 indicated by the dash lines in FIG. 19, that is, the position shown in FIG. 18, is moved to the central position of the shaft 71 indicated by the solid lines, the stopping member 42 is pushed by the side edge of the stopper 82 so that the stopping member 42 is rotated counterclockwise about the shaft 44 from the position indicated by the dash lines (i.e., the position shown in FIG. 18) to the position indicated by the solid lines in FIG. 19.

The forward movement of the slider 1 is finished by the bent 42a of the stopping member 42 coming into contact with the side edge of the stopper 82.

Figure 4:
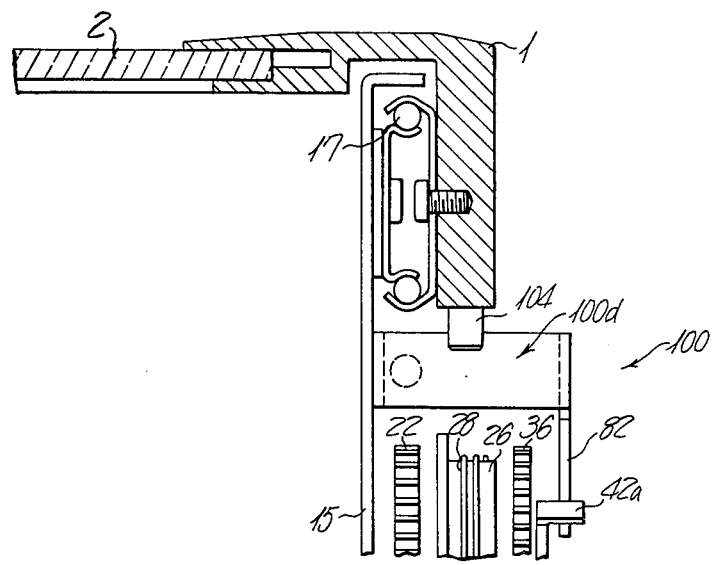
FIG. 4 is a schematic sectional view of a slider stopper to be attached to the slider of the invention.
Figure 5:
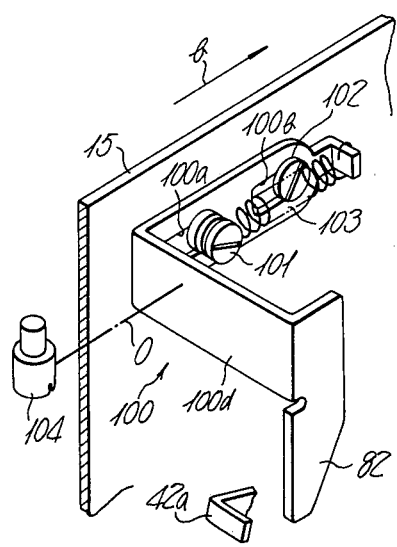
FIG. 5 is a perspective view of the slider stopper of FIG. 4.
Figure 6:
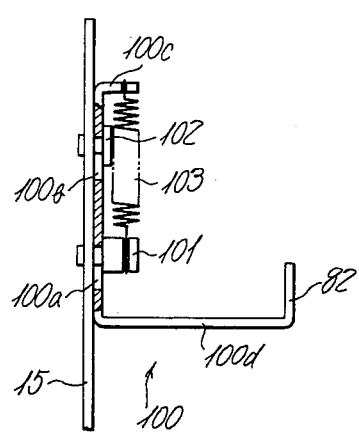
FIG. 6 is a schematic partial sectional view of the stopper of FIG. 4.
Figure 7:
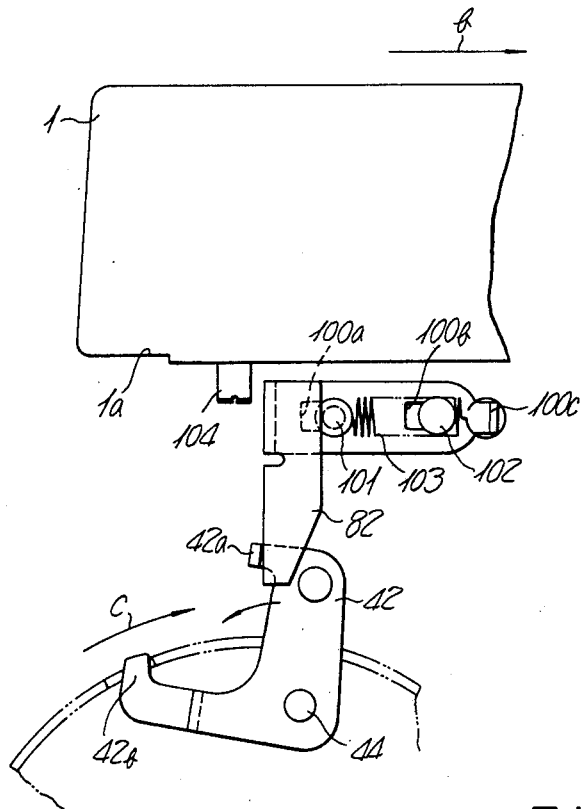
FIG. 7 is a schematic side elevation of the slider stopper of FIG. 4 when the slider of the present invention is in a position prior to its forward movement.

Referring to FIGS. 4 to 6, the stopping mechanism of the slider 1 will be described. A slider stopper 100 is attached to the fixed side plate 15 by pin members 101, 102 so as to be slidable within the range of the slots 100a, 100b in the moving direction of the slider 1.

A spring 103 is spanned between a bent end 100c of the slider stopper 100 and the pin member 101 so that a bias opposite to the direction b of the forward movement of the slider 1 is given to the slider stopper 100.

An abutment bent arm 100d of the slider stopper 100 is located in a path O of a stopper pin 104 fixed to a rear end portion 1a of the slider 1. The stopper pin 104 is located in a position free from interference with the wire 28. A part of the abutment arm 100d of the slider stopper 100 extends downwards. This part is in the rotating path of the bent end 42a of the stopping member 42 and forms the stopper 82.

Figure 8:
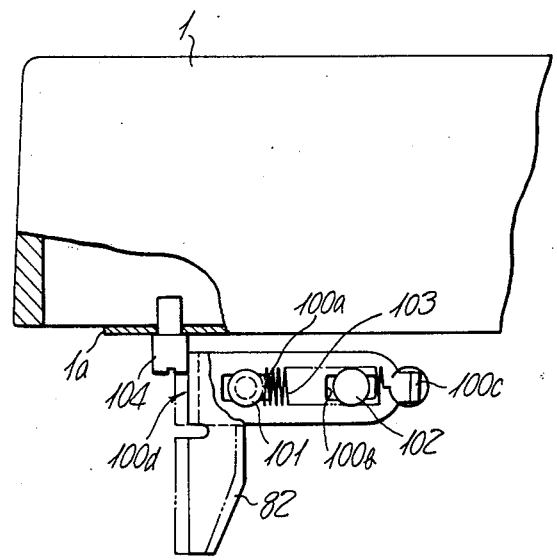
FIG. 8 is a schematic side elevation of the slider stopper of FIG. 4 when the slider of the present invention has completed its forward movement.

When the copying process is started by pressing the print button, the stopping member 42 is rotated in the direction of the arrow c and the slider 1 is moved forward in the direction of the arrow b. When the bent end 42a of the stopping member 42 is engaged with the stopper 82, the stopping member 42 is rotated counterclockwise about the shaft 44, and the ratchet pawl 43, which is substantially integral with the stopping member 42, is disengaged from the rotating member 23, whereby the driving force for moving the slider 1, is disconnected. The slider 1 from which the driving force has been disconnected, continues to move in the direction of the arrow b by the force of inertiaitz. However, it is stopped by the stopper pin 104 colliding with the abutment arm 100d as shown in FIG. 8, but the shock of the collision is absorbed by the spring 103. In other words, when the pin 104 collides with the stopper 100, the stopper 100 is pushed against the bias of the spring 103, with the result that the pin 104 is stopped with the shock being absorbed by the spring 103.

Referring to FIG. 19, in accordance with the counterclockwise rotation of the stopping member 42, the shaft 44, which is substantially integral with the stopping member 42, is rotated in the same direction as that of the stopping member 42. Also by the rotation of the shaft 44, the ratchet pawl 43, which is substantially integral with the shaft 44, is rotated in the same direction. As a result, the stopping pawl 43a, which has been engaged with the notch 23a of the cam member 23 until then, is retracted from the notch 23a. By the counterclockwise rotation of the stopping member 42, the stopping projection 42b is lowered from the position shown in FIG. 18 and is brought inside as shown in FIG. 19 and, at the same time, the backward movement gear 36 is rotated counterclockwise through a predetermined angle relative to the wire drum 26 by the movement of the pin 42c of the stopping member 42 to the left, so that the right side inner edge of the hole 36a of the backward movement gear 36 is brought into pressure contact with the boss portion 41b.

By the above-mentioned disengagement of the stopping pawl 43a from the notch 23a, the wire drum 26, the rotation operation member 25, the backward movement gear 36, the rotation control member 70 and the control disk 75 in FIG. 10 are all stopped since they are disconnected from the drive transmission. By the wire drum 26 being stopped, the original table 1, which has been in the forward movement until then, is stopped. Irrespective of the stop of the above-mentioned elements, the photoconductor drum 3, the shaft 18, the gear 22, the cam member 23, and the auxiliary feed cam 74 continue to be rotated integrally in the direction of the arrow a.

Figure 11:
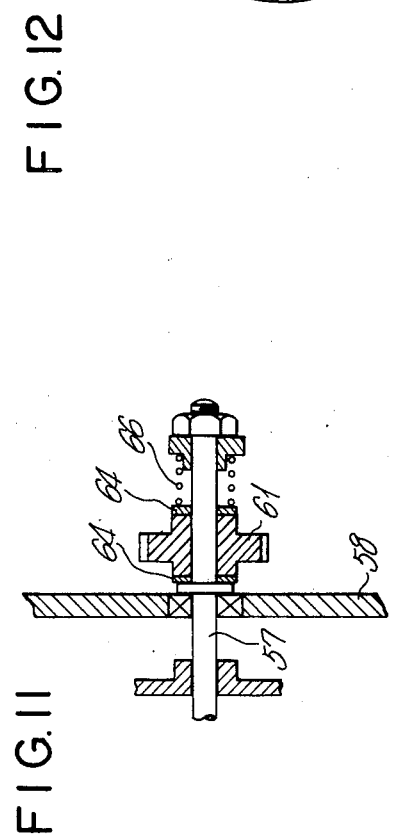
FIG. 11 is a schematic sectional view of a mechanism of a backward movement driving gear of the present invention.

A forward movement solenoid 63 shown in FIG. 10 is designed to be energized after the disengagement of the stopping pawl 43a from the notch 23a in FIG. 19 and, at the same time, a lever 58 in FIG. 10, which is pivotally mounted on the shaft 57, is rotated in the direction of the arrow about the shaft 57 against the bias of a spring 60, whereby the pinion 62 engaged with the backward movement driving gear 61, which is rotated in the direction of the arrow by the driving mechanism comprising the chain 52, is engaged with the backward movement gear 36. The gear 61 is frictionally coupled with the shaft 57 through a frictional lining 64 and the spring 66 as shown in FIG. 11. When a shock is caused by an abnormal transmission of the rotation at the time of the above-mentioned coupling, it is absorbed by this mechanism.

The moment the pinion 62 is engaged with the gear 36, the gear 36 begins to rotate in the direction opposite to the rotating direction of the rotating member 23, namely counterclockwise. Then the right inner edge of the hole 36a formed in the gear 36 pushes the hub portion 41b of the bush 41. In other words, the bush 41 is moved counterclockwise around the shaft 18, whereby the rotation operation member 25 and the wire drum 26 shown in FIG. 10 are rotated in the direction opposite to the arrow. As a result, the original table 1 shown in FIG. 3 beings to move backwards in the direction opposite to the arrow b from its stationary position, namely the position indicated by long and short dash lines.

Figure 20:
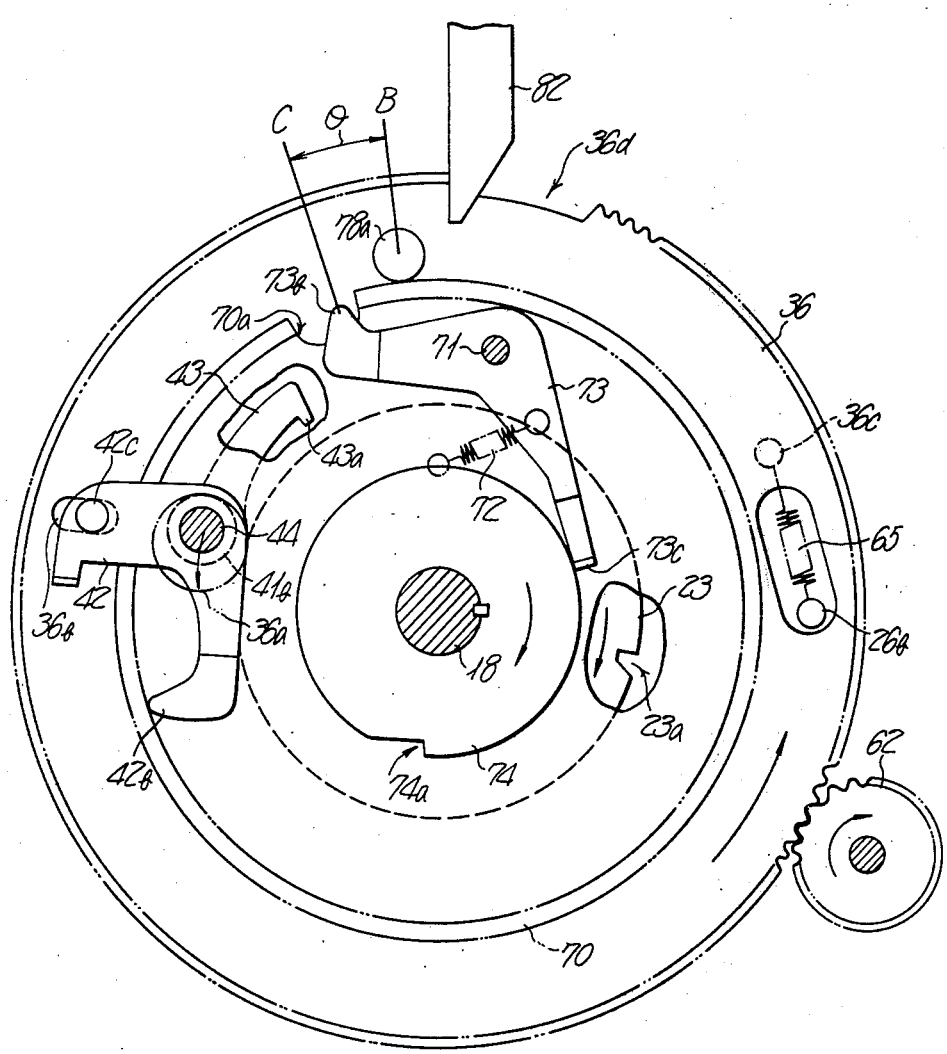
FIG. 20 is a partly schematic sectional side view of the main portion of the slider reciprocating driving apparatus of FIG. 13, in which the rotation control member is stopped, a rotating member continues to rotate clockwise and a backward movement gear is in counterclockwise rotation.

The gear 36 is rotated counterclockwise from the position shown in FIG. 19 to the position shown in FIG. 20, while the rotation control member 70 which is fitted on the shaft 18, is stopped in the position shown in FIG. 19, since the pin 78a is brought into pressure contact with the peripheral surface of the rotation control member 70 by the spring 81 shown in FIG. 10. Accordingly, the feed lever 73 attached to the rotation control member 70 remains stopped at the position shown in FIG. 19. In contrast with this, the stopping member 42, which has been facing the feed lever 73 until then departs, moves away from the feed lever 73 as shown in FIG. 20, and the stopping projection 42b is moved in pressure contact with the inner peripheral surface of the stopped rotation control member 70 under the clockwise rotating bias of the stopping member 42 about the shaft 44. Therefore, the stopping pawl 43a of the ratchet pawl 43 which is substantially integral with the stopping member 42 is kept disengaged from the notch 23a of the rotating member 23.

Figure 21:
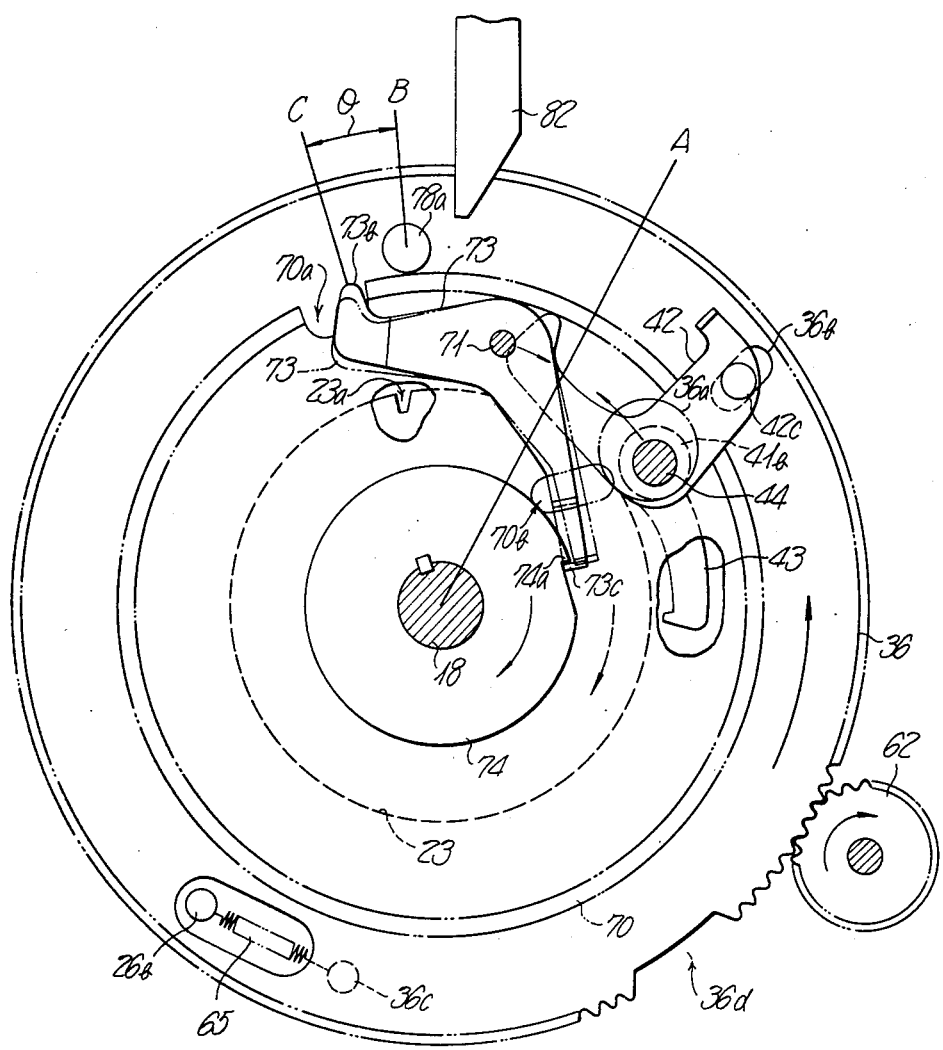
FIG. 21 is a schematic partly sectional side view of the main portion of the apparatus of FIG. 13, in which a feed lever and a stopping member are about to return to their respective home positions.

The gear 36 continues to be rotated from the position shown in FIG. 20 to the position shown in FIG. 21 by the driving action of the pinion 62. In the meantime, the auxiliary feed cam 74 is rotated clockwise. When the auxiliary feed cam 74 is rotated from the position shown in FIG. 20 to the position shown in FIG. 21, the projection 73c of the feed lever 73, which is brought into pressure contact with the peripheral surface of the auxilary feed cam 74 by the spring 72, is engaged with a cam step 74a of the auxiliary feed cam 74. Thus, the rotation control member 70 is rotated clockwise through a predetermined angle through the shaft 71 on which the feed lever 73 is pivotally mounted, so that the axis of the shaft 71 comes to a position corresponding to a position A (refer to FIG. 15). In the meantine, the gear 36 is continuously rotated counterclockwise so that the axis of the shaft 44 of the stopping member 42 also coincides with the position A. In other words, the two axes coincide as shown in FIG. 15. At this moment, the pin 78a of the operation lever 78 enters the stopping notch 70a of the rotation control member 70, whereby the feed lever 73 is rotated counterclockwise about the shaft 71 so that the projection 73c is disengaged from the cam step 74a of the auxiliary feed cam 74. Namely, the stopping member 42 and the feed lever 73 return to their respective original positions shown in FIG. 13.

Figure 22:
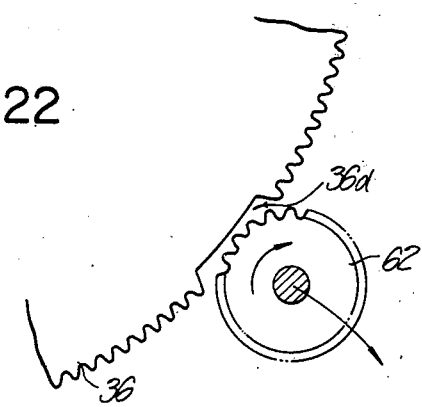
FIG. 22 is a schematic partly sectional side view of a recessed flat portion of the backward movement gear which faces a pinion with a further counterclockwise rotation of the backward movement gear from the position shown in FIG. 21, so that backward movement gear is disengaged from the pinion.

Referring to FIG. 21, the forward movement solenoid 63 (refer to FIG. 10), which has been energized until then, is deenergized when the shaft 44 of the stopping member 42 reaches a position corresponding to the position A, that is, when a flat portion 36d formed at the peripheral surface of the gear 36 comes to face the pinion 62 (see FIG. 22). At the same time, the lever 58 is rotated about the shaft 57 in a direction opposite to the arrow under the bias of the spring 60 so that the pinion 62 shown in FIG. 22 is disengaged from the flat portion 36d as shown in FIG. 13.

At this position, the counterclockwise rotation of the gear 36 is stopped. Accordingly, the backward movement of the slider 1 is stopped at its home position shown in FIG. 3. In case only one copy is made, the driving chain 52 is also stopped, and the rotating member 23 shown in FIG. 21 and the cam 74 shown in FIG. 8 are rotated to their respective original positions.

Therefore, the slider 1 begins to move forward from the position of the parts shown in FIG. 15 and stops in the position of the parts shown in FIG. 19, and from this position, it begins to move backwards by the pinion 62 being engaged with the gear 36 so that, when the flat portion 36d shown in FIG. 21 comes to face the pinion 62, namely when the pinion 62 is disengaged from the gear 36 as shown in FIG. 22, the slider 1 stops its backward movement.

When the slider 1 is returned to its original position, its correct position must be set. In case its correct position is set by a fixed stopper 33 as shown in FIG. 3, the flat portion 36d need not be formed if the forward movement solenoid 63 shown in in FIG. 10 has to be deenergized the moment a pin 32 attached to one end of the wire 28 comes in contact with the stopper 33. However, it is extremely difficult to perform such an operation instantly with good timing and when the timing of the energizing the solenoid 63 is delayed, a great shock and load is applied to a driving system on the side of the pinion 62. From this point of view, the flat portion 36d is formed in a part of the peripheral surface of the gear 36, and when the backward movement of the slider 1 is over, the positioning of the slider 1 is determined by the stopping action of the stopper 33. At the same time, the flat portion 36d is caused to face the pinion 62 so that the gear 36 is disengaged from the pinion 62, whereby the above-mentioned disadvantage is eliminated. For this reason, the flat portion 36d is formed in the gear 36.

In the position shown in FIG. 19, the pinion 62 is engaged with the gear teeth of the gear 36 near the flat portion 36d, excluding the flat portion 36, and when the pinion 62 faces the flat portion 36d in the position shown in FIG. 17, the pinion 62 is retracted from the flat portion 36d. Therefore, the backward movement gear 36 does not make a complete one revolution. For such a mechanical reason, the feed lever 73 which is moved clockwise around the shaft 18 integrally with the stopping member 42 in FIG. 15, is rotated from the position A shown in FIG. 15 to the position shown in FIG. 14. However, it does not make one complete revolution, but stops before the position A, namely at the position on a side of the stopper 82. Therefore, it is necessary to move the lever 73, which has been stationary in FIG. 21, (that is, the axis of the shaft 71) auxiliary to its original position A. It is the cam 74 that performs this function. By this auxiliary feeding function, the lever 73 is moved clockwise through an angle of θ so that the projection 73b comes to face the pin 78a. At the same time, the rotation control member 70 is auxiliarily rotated so that it makes exactly one revolution from its original position shown in FIG. 13.

The movement of the rotation control member 70 will be now described in more detail. The rotation control member 70 begins to rotate clockwise from the position shown in FIG. 15 through the position shown in FIG. 17 to the position shown in FIG. 19 where it is stopped temporarily, and the projection 73c of the lever 73 is engaged with the cam step 74a of the cam 74 which is rotated clockwise in FIG. 21, whereby the rotation control member 70 which has been stopped is auxiliarily rotated to its original position shown in FIG. 13. Thus, the member 70 makes exactly one revolution from its original position. Meanwhile, the shaft 18 on which the photoconductor drum 3 is fixedly mounted begins to rotate clockwise from its position shown in FIG. 13 and finishes almost one revolution at the position shown in FIG. 19. Furthermore, it is rotated to the position shown in FIG. 21 and finishes the second revolution at the position shown in FIG. 13. Thus, the photoconductor drum 3 makes exactly two revolutions. As mentioned previously, one copy is obtained during the two revolutions of the drum 3.

To sum up, the rotation control member 70 makes one revolution during the two revolutions of the drum 3. To be more specific, the member 70 always makes one revolution in the same direction irrespective of two revolutions of the rotating member 23 in the forward direction or irrespective of the forward and backward revolutions of the rotation operation member 25.

In an electrophotographic copying machine employing the present invention, one copy is obtained by two revolutions of a photoconductor drum. However, the feed of a transfer sheet is effected one time during the two revolutions of the photoconductor drum. From this point of view, the control of a process sequence, such as a paper feed, can be performed by the rotation control member 70 which makes only one revolution in one direction.

Figure 16:
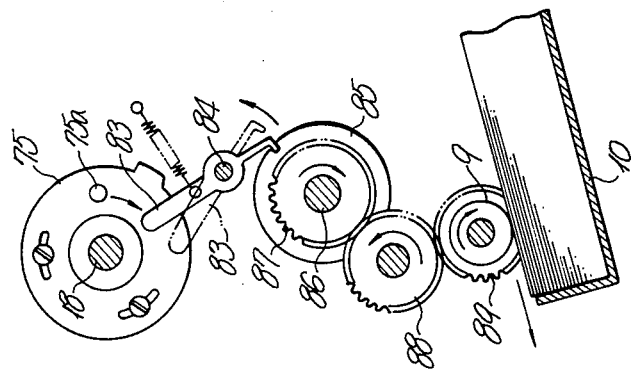
FIG. 16 is a schematic sectional view of a paper feed apparatus which is in operation by an intermittently rotating control disk.

For example, as shown in FIG. 15, a control pin 75a (refer to FIG. 10) is fixed to the control disk 75 which is rotatable with the rotation control member 70. During the clockwise rotation of the control disk 75, a stopping arm 83, which is a controlled member, is kicked by the control pin 75a. In other words, in FIG. 16, the stopping arm 83 is rotated counterclockwise about a fixed shaft 84 on which the stopping arm 83 is pivotally mounted, so that the stopping operation of a sleeve 85 of a well-known spring clutch is released. By this releasing action, the rotation of a transmission shaft 86 is transmitted to a gear 89 so that the paper feed roller 9 (refer to FIG. 1) which is substantially integral with the gear 89 is rotated in the direction of the arrow. Thus, a top sheet on the paper feed table 10 is transported to the image transfer station by the sheet feeding action of the paper feed roller 9 as shown in FIG. 1. Thus, by use of the movement of the rotation control member 70, an initiation step of the copying process, such as the paper feed, can be securely controlled. Supposing that the control disk 75 has made two revolutions together with the photoconductor drum 3, the sheet feed apparatus is operated two times and accordingly two transfer sheets are fed. Such a trouble, however, does not occur in the rotation control apparatus according to the present invention.

Furthermore, by use of the movement of the rotation control member 70, a control of a sheet separation can be made as well as the above-mentioned paper feed operation. Referring to FIG. 1, since the leading edge of the transfer sheet S is electrostatically attracted to the photoconductor drum 3, the transfer sheet S has to be separated appropriately from the surface of the drum 3. This separation has to be made one time during two revolutions of the drum 3. In order to do this, as shown in FIG. 13, a cam portion 75b is formed on a part of the peripheral surface of the control disk 75 which rotates with the rotation control member 70, and that the cam portion 75b is designed so as to push a pin 91a of a follower lever 91 when the control disk 75 is rotated to the position shown in FIG. 17. The lever 91 is then rotated counterclockwise about a fixed shaft 92 from the position shown in FIG. 13 to the position shown in FIG. 17. At this moment, a separating pawl 93 which moves with the lever 91 is brought into pressure contact with the peripheral surface of the drum 3 so that the leading end portion of the transfer sheet S is separated from the peripheral surface of the drum 3 as shown in FIG. 17. Alternatively, the cam portion 75b and the control pin 75a can be provided on the rotation control member 70.

Thus, by use of the rotation control member which makes one revolution in one direction with respect to a driving system, a sequence control of the various copying steps can be performed.

In the present invention, the slider 1 can be freely moved forwards and backwards when the copying machine is stopped. To be more specific, referring to FIG. 15, the stopping pawl 43a of the ratchet pawl 43, which is rotates with the stopping member 42, is engaged from the notch of the rotating member 23 and, referring to FIG. 19 the stopping pawl 43a is disengaged from the notch 23a. Except for the above-mentioned two positions in FIGS. 15 and 19, the stopping pawl 43a is continuously disengaged from the notch 23a since the stopping projection 42b of the stopping member 42 is moved in pressure contact with the inner peripheral surface of the rotation control member 70. Thus, in the copying machine employing the present invention, the slider 1 can be freely moved forwards and backwards manually. Referring to FIG. 10, when the slider 1 (see FIG. 3) is moved forwards, the wire drum 26 is rotated forwards (i.e., clcokwise) and when the slider 1 is moved backwards, the drum 26 is rotated backwards (i.e., counterclockwise). The backward movement gear 36 makes the same rotations as does the drum 26 through the rotation operation member 25. At this moment, the stopping member 42 is revolved clockwise or counterclockwise around the shaft 18 in FIG. 10. When stopping member 42 is rotated counterclockwise around the shaft 18, the stopping projection 42b is moved onto the inner peripheral surface of the member 70 from the stationary position of the stopping projection 42b so that the projection 42b is moved in pressure contact with the inner peripheral surface of the member 70. Therefore, the clockwise rotation of the member 42 is hindered, so that the stopping pawl 43a of the ratchet pawl 43 is disengaged from the notch 23a of the rotating member 23 even if the stopping pawl 43a comes to the notch 23a.

So long as the copying machine employing the present invention is stopped, the stopping member 42 is rotated counterclockwise since the stopping projection 42b is pushed downwards by the pin 78a of the operation lever 78 so that the stopping pawl 43a of the ratchet 43 is disengaged from the notch 23a of the rotating member 23. Therefore, the slider 1 of the present invention can be moved manually forwards and backwards smoothly.

What is claimed is:

1. A slider reciprocating driving apparatus for controlling reciprocating movement of a slider having a contact glass thereon for use with an electrophotographic copying machine of the type in which one copy is obtained by two revolutions of a photoconductor drum, said apparatus comprising, in combination, a drum shaft mounting said photoconductor drum, rotation operation means rotatably mounted on said drum shaft, and which reciprocates said slider with one reciprocating cycle of said slider corresponding to two revolutions of said photoconductor drum, rotating means fixedly mounted on said drum shaft, and having a first notch in the peripheral surface thereof, rotation control means rotatably mounted on said drum shaft, and having a second notch in the peripheral surface thereof, stopper means comprising a rotatable shaft, rotatably mounted on said rotation operation means and disposed parallel to said drum shaft, and two ratchet pawls fixedly mounted on said rotatable shaft, one ratchet pawl being engageable with said notch of said rotating means and the other ratchet pawl being engageable with said notch of rotation control means, forward driving means operable to drive said rotating means to move said slider in the forward direction, engagement means operable to engage said two ratchet pawls with said first notch of said rotating member and said second notch of said rotation control member, respectively, when said slider is to be moved forwards, disengagement means operable to disengage said two ratchet pawls from said notch of said rotating member and that of said rotation control member, respectively, when the forward movement of said slider has been completed, backward driving means operable to drive said rotating means reversely to move said slider in the backward direction when forward movement of said slider has been completed, and releasing means operable to disengage said backward driving means from said rotation operation member.

2. A slider reciprocating driving apparatus as claimed in claim 1, wherein said rotation operation means comprises a wire drum around which a wire for pulling said slider is wound, and a rotation operation member substantially integral with said wire drum and rotatably mounted on said drum shaft.

3. A slider reciprocating driving apparatus as claimed in claim 1, wherein said rotating means comprises a forward movement driving gear fixed to rotate with said drum shaft, and a rotating member, having said first notch at the peripheral surface thereof, integral with said forward movement driving gear, said forward movement driving gear being engaged with said forward driving means.

4. A slider reciprocating driving apparatus as claimed in claim 1, wherein said rotation control means comprises a disk whose peripheral edge extends parallel to said drum shaft and which has said second notch at its peripheral edge portion of said disk.

5. A slider reciprocating driving apparatus as claimed in claim 1, wherein said stopper means is disengaged from said rotating means and from said rotation control means when the electrophotographic copying machine is not in operation.

6. A slider reciprocating driving apparatus as claimed in claim 1, wherein said backward driving means comprises a backward movement gear rotatably supported on said drum shaft and substantially integral with said rotation operation means, and a backward driving means operable to drive said backward movement gear in engagement with said backward movement gear only when said slider is moved backwards.

7. A slider reciprocating driving apparatus as claimed in claim 1, including sheet feeding means; said rotation control means being connected to said sheet feeding means, said rotation control means performing one single rotation for each two rotations of said photoconductor drum and, with each single rotation of said rotation control means, operating said sheet feeding means.

8. A slider reciprocating driving apparatus as claimed in claim 1, including transfer sheet separation means, said rotation control means being connected to said transfer sheet separation means, said rotation control means making one single rotation for each two rotations of said photoconductor drum and, during each one single rotation thereof, operating said transfer sheet separation means.

9. A slider reciprocating driving apparatus as claimed in claim 1, in which said electrophotographic copying machine comprises a side plate, a stopper pin fixed to a rear end portion of said slider, and a slider stopper disposed at a position where the forward movement of said slider is completed, said slider stopper comprising an abutment member located in the path of said stopper pin, fixing members slidably securing said abutment member to said side plate, shock absorbing spring means connected between said abutment and said fixing members, said abutment member having an end extending as a stopper and serving as a member of said disengaging means for switching the forward movement of said slider to the backward movement thereof.

* * * * *